(12) United States Patent
Gitt

(10) Patent No.: US 7,018,831 B2
(45) Date of Patent: Mar. 28, 2006

(54) COMPOSTING APPARATUS AND METHOD

(75) Inventor: Brian Gitt, Fairfax, CA (US)

(73) Assignee: Biosystem Solutions, Inc., Santa Clara, CA (US)

( * ) Notice: Subject to any disclaimer, the term of this patent is extended or adjusted under 35 U.S.C. 154(b) by 274 days.

(21) Appl. No.: 09/965,193

(22) Filed: Sep. 26, 2001

(65) Prior Publication Data

US 2003/0059931 A1    Mar. 27, 2003

(51) Int. Cl.
C05F 17/02 (2006.01)

(52) U.S. Cl. .............................. 435/290.1; 435/290.2; 435/291.3; 119/6.7

(58) Field of Classification Search ............ 435/290.1, 435/290.2, 290.4, 283.1, 291.2, 291.4; 71/8–10; 34/197, 193; 220/502; 222/161, 189.03, 222/189.05; 119/6.7; 209/370, 357, 352–388
See application file for complete search history.

(56) References Cited

U.S. PATENT DOCUMENTS

| | | | |
|---|---|---|---|
| 482,511 A * | 9/1892 | Storie | ...................... 209/357 |
| 1,013,546 A | 1/1912 | Gibeau et al. | |
| 1,406,496 A | 2/1922 | Ruthledge | |
| 1,919,836 A | 7/1933 | Goldborough | |
| 2,126,168 A | 8/1938 | Brechaud | |
| 3,438,677 A | 4/1969 | Redpath | |
| 4,050,917 A | 9/1977 | Varro | |
| 4,108,625 A | 8/1978 | Okada | |
| 4,501,604 A | 2/1985 | Odaira | |
| 4,552,726 A | 11/1985 | Grappelli et al. | |
| 4,683,674 A | 8/1987 | Faul | |
| 4,971,616 A | 11/1990 | Glogowski | |
| 5,082,486 A | 1/1992 | Glogowski | |
| 5,190,572 A | 3/1993 | Long | |
| 5,244,804 A | 9/1993 | Horkan et al. | |
| 5,377,921 A * | 1/1995 | Wirth | ...................... 241/29 |
| 5,441,552 A | 8/1995 | DeLillo | |
| 5,551,969 A | 9/1996 | Wright | |
| 5,632,419 A | 5/1997 | Pickens | |
| 5,741,344 A | 4/1998 | Warkentin | |
| 5,811,007 A | 9/1998 | Stewart et al. | |
| 5,846,815 A | 12/1998 | Wright | |
| 5,971,303 A | 10/1999 | Pugh-Gottlieb | |
| 6,117,671 A | 9/2000 | Yilmaz | |
| 6,223,687 B1 | 5/2001 | Windle | |

FOREIGN PATENT DOCUMENTS

| | | |
|---|---|---|
| EP | 196887 A2 * | 10/1986 |
| EP | 0321596 A1 | 6/1989 |
| EP | 472771 A * | 3/1992 |
| FR | 2594434 A1 | 8/1987 |
| GB | 2290936 A * | 1/1996 |

(Continued)

OTHER PUBLICATIONS

Worm World, Inc., "The Worm Gin", gnv.fdt.net/~windle/neal/index.htm, Aug. 8, 2001 (print date), 7 pgs.

(Continued)

Primary Examiner—William H. Beisner
(74) Attorney, Agent, or Firm—Johnson & Stainbrook LLP; Craig M. Stainbrook; Larry D. Johnson

(57) ABSTRACT

Composting apparatuses and composting methods are disclosed. In one embodiment, a composting apparatus includes a housing and a plurality of composting drawers in the housing. The plurality of composting drawers is in a stacked relationship when in the housing, and each drawer includes a bottom region having a plurality of apertures. A plurality of receiving structures is in the housing, and the receiving structures are respectively disposed under the plurality of composting drawers to receive composted material.

5 Claims, 9 Drawing Sheets

FOREIGN PATENT DOCUMENTS

| | | | |
|---|---|---|---|
| JP | 09019622 A | * | 1/1997 |
| JP | 10236218 A | * | 9/1998 |
| JP | 11100288 A | * | 4/1999 |
| SU | 2054402 C1 | * | 2/1996 |

OTHER PUBLICATIONS

Original Vermitech Systems Ltd., "The Vermi Organic Digester", www.vermitechsystems.com/products.html. Aug. 8, 2001 (print date), 2 pgs.

Worm Wigwam, "Worm Bins —Vermicomposting Systems", www.wormwigam.com, Aug. 8, 2001 (print date), 2 pgs.

J. Dominguez, et al., "A Comparison of Vermicomposting and Composting", gnv.fdt.net/~windle/reference/april97.htm, Apr. 1997, 5 pgs.

* cited by examiner

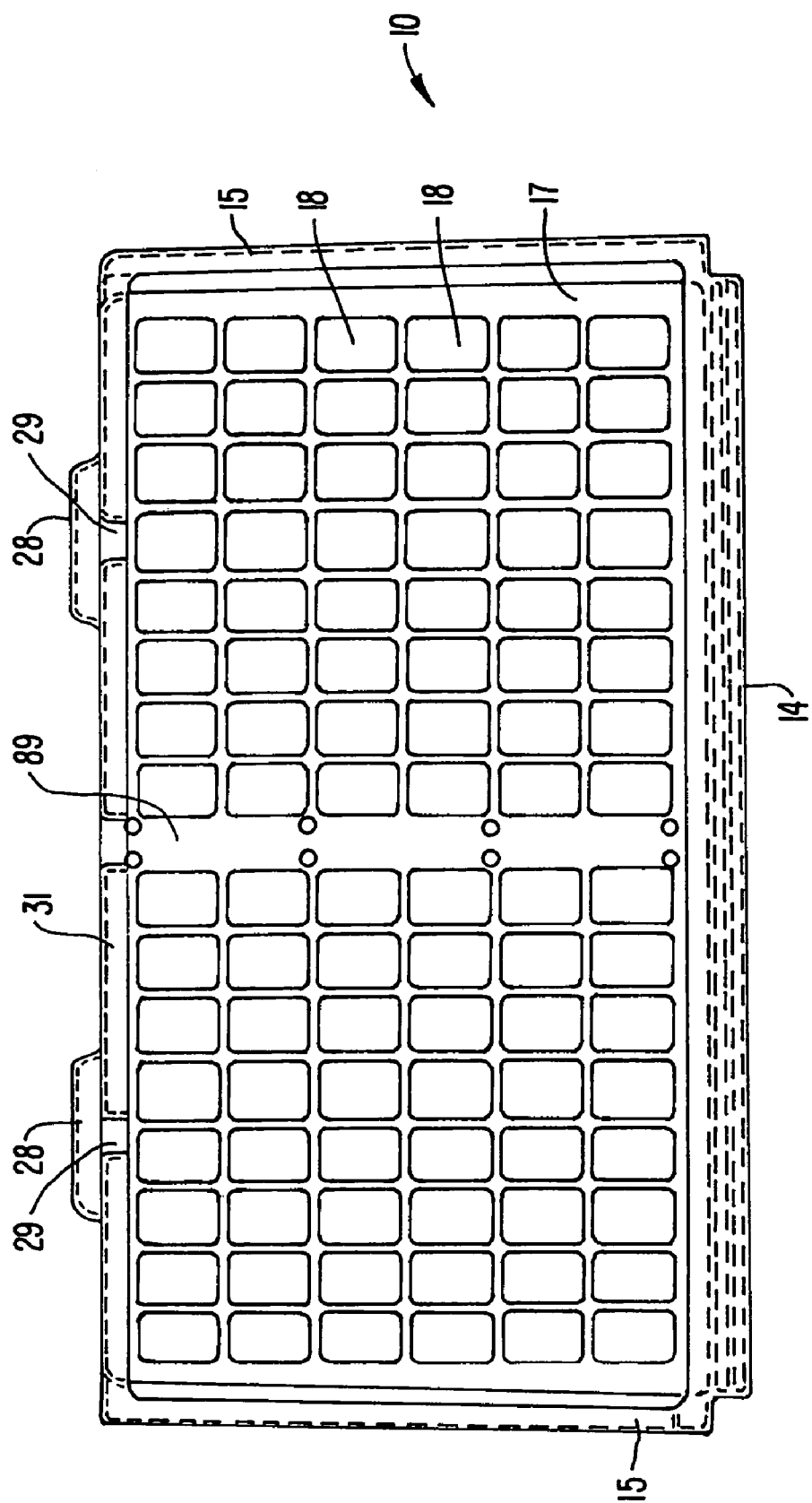

though the top of the cylindrical container and the composted material passes out of the bottom of the cylindrical container. To help the composted material to pass out of the bottom of the cylindrical container, a bar is used to agitate the material near the bottom of the composting material, which rests upon a steel grate. The steel grate is located above the bottom of the container. To move the bar, a crank handle that is coupled to the container is turned around and around. In response, the bar moves across the bottom of the cylindrical container to agitate the composted material at the bottom. The agitated composted material then passes through holes in the steel grate that supports the composted material above the bottom of the container.

COMPOSTING APPARATUS AND METHOD

BACKGROUND OF THE INVENTION

An increasingly pressing problem in the area of waste disposal exists due to the rising costs of and limited space for landfills. Waste management companies and municipalities continue to search for viable alternatives to using landfills. These include recycling, incineration and composting. The common goal of waste treatment and recycling methods is to process waste safely, efficiently, and at a low cost, while using as much of the waste as possible to produce useful products. The more waste that can be transformed into usable products, the less waste that needs to be put in a landfill.

Composting is used to convert organic waste into a useable product. More specifically, this natural process reduces organic waste by converting it to natural fertilizer in the form of humus. One example of a specific type of composting is vermicomposting. In a typical vermicomposting process, worms are used to turn organic waste such as food and/or paper waste (e.g., low grade paper waste) into a premium soil supplement. The organic waste can be broken down by earthworms and micro-organisms resulting in a stable, nontoxic material with good structure. The material has potentially high economic value as a soil supplement for plant growth.

Both large and small scale composting systems exist. Large scale composting apparatuses occupy large amounts of space, use complicated machinery, and/or are labor intensive. Because they occupy a lot of space, such large scale composting apparatuses are typically at remote locations, far away from a school, factory, farm, restaurant, or other facility where organic waste is generated. Transporting the organic waste to a large scale composting facility at a remote location is costly. Unless very large quantities of organic waste are created, the cost of transporting the organic waste to the composting facility may be more than the cost of disposing of the organic waste in a landfill. This tends to discourage composting rather than encourage composting.

Small scale composting apparatuses could be used at the facilities where organic waste is generated. However, many existing small scale composting apparatuses are labor intensive, mechanically complicated, and/or do not have high enough compost production rates. For example, one commercially available composting apparatus is called the "Worm Wigwam". This composting apparatus is in the form of a cylindrical container. Compostable material is fed through the top of the cylindrical container and the composted material passes out of the bottom of the cylindrical container. To help the composted material to pass out of the bottom of the cylindrical container, a bar is used to agitate the material near the bottom of the composting material, which rests upon a steel grate. The steel grate is located above the bottom of the container. To move the bar, a crank handle that is coupled to the container is turned around and around. In response, the bar moves across the bottom of the cylindrical container to agitate the composted material at the bottom. The agitated composted material then passes through holes in the steel grate that supports the composted material above the bottom of the container.

While an apparatus such as the Worm Wigwam can process organic waste at the facility producing the organic waste, a number of improvements could be made to the Worm Wigwam. For example, to move the bar and agitate composted material for harvesting, the user must turn the crank handle many times. This is very labor intensive. Also, the compost production rate of the Worm Wigwam is low. For example, in the Worm Wigwam, 1 to 2 inches of composted material might be harvested every day or so, from an area equal to the bottom region of the composting mass which is the same as the area of the cylindrical container. A typical Worm Wigwam may have a diameter of about 3 feet, so the volume of composted material produced would be about 0.58 to about 1.16 cubic feet per day. A facility such as a school, for example, may need to process much more waste than a single Worm Wigwam can process. Although more than one composting apparatus could be purchased to increase the compost production rate, this would undesirably increase the amount of space occupied by composting apparatuses and the amount of labor involved. In urban environments in particular, available space is difficult to find so that simply obtaining more composting apparatuses may not be a practical way to increase the composting rate.

Embodiments of the invention address these and other problems, collectively and individually.

SUMMARY OF THE INVENTION

Embodiments of the invention include, but are not limited to, composting apparatuses, methods of using composting apparatuses, methods for loading compostable material into composting apparatuses, and composting systems.

One embodiment of the invention is directed to a composting apparatus comprising: a housing; a plurality of composting drawers in the housing, wherein the plurality of composting drawers are in a stacked relationship when in the housing, and wherein each drawer includes a bottom region having a plurality of apertures; and a plurality of receiving structures in the housing, the receiving structures being respectively disposed under the plurality of composting drawers to receive composted material from the plurality of composting drawers.

One embodiment of the invention is directed to a method of using a composting apparatus comprising: placing compostable material and composting organisms into each of a plurality of drawers, wherein the drawers in the plurality of drawers are in a stacked relationship; composting the compostable material within the plurality of drawers to form composted material within each of the plurality of drawers; agitating the composted material in the plurality of drawers; and passing the agitated composted material through the plurality of apertures at the bottom region of each drawer within the plurality of drawers.

Another embodiment of the invention is directed to a composting apparatus comprising: a) a composting container adapted to contain a composted material, the composting container having a plurality of side regions and a bottom region defining an inner region for receiving compostable material and composting organisms, wherein the bottom region has a plurality of apertures through which composted material can pass through; and b) a breaker device comprising a grid above the bottom region of the composting container, wherein the breaker device is adapted to agitate composted material at the bottom region of the composting container so that the composted material passes through the plurality of apertures in the bottom region of the composting container.

Another embodiment of the invention is directed to a method of using a composting apparatus comprising: placing a compostable material and composting organisms into a container, the container having a plurality of side regions and a bottom region defining an inner region for receiving the compostable material and the composting organisms, wherein the bottom region has a plurality of apertures through which composted material can pass through; composting the compostable material to form composted material; manually agitating the composted material; and passing the composted material through the plurality of apertures at the bottom region of the container.

Another embodiment of the invention is directed to a composting method comprising: a) obtaining a transfer container and compostable material within the transfer container; b) tilting the transfer container; c) vibrating the transfer container; and d) dispensing the compostable material while vibrating the transfer container.

Another embodiment of the invention is directed to a composting system comprising: a shipping container; and a composting apparatus inside of the shipping container. The composting apparatus may be adapted to perform a vermicomposting process.

Yet other embodiments of the invention are directed to composting systems using composting apparatuses.

These and other embodiments of the invention are described in further detail below with reference to the following Figures.

BRIEF DESCRIPTION OF THE DRAWINGS

In FIG. 1, the composting apparatus' doors are open so that its interior is visible.

In FIG. 5, there is one set of drawers and each of the drawers in the set open in a single direction.

FIG. 6(a) shows a top view of a composting drawer according to an embodiment of the invention.

DETAILED DESCRIPTION

Figure 1:
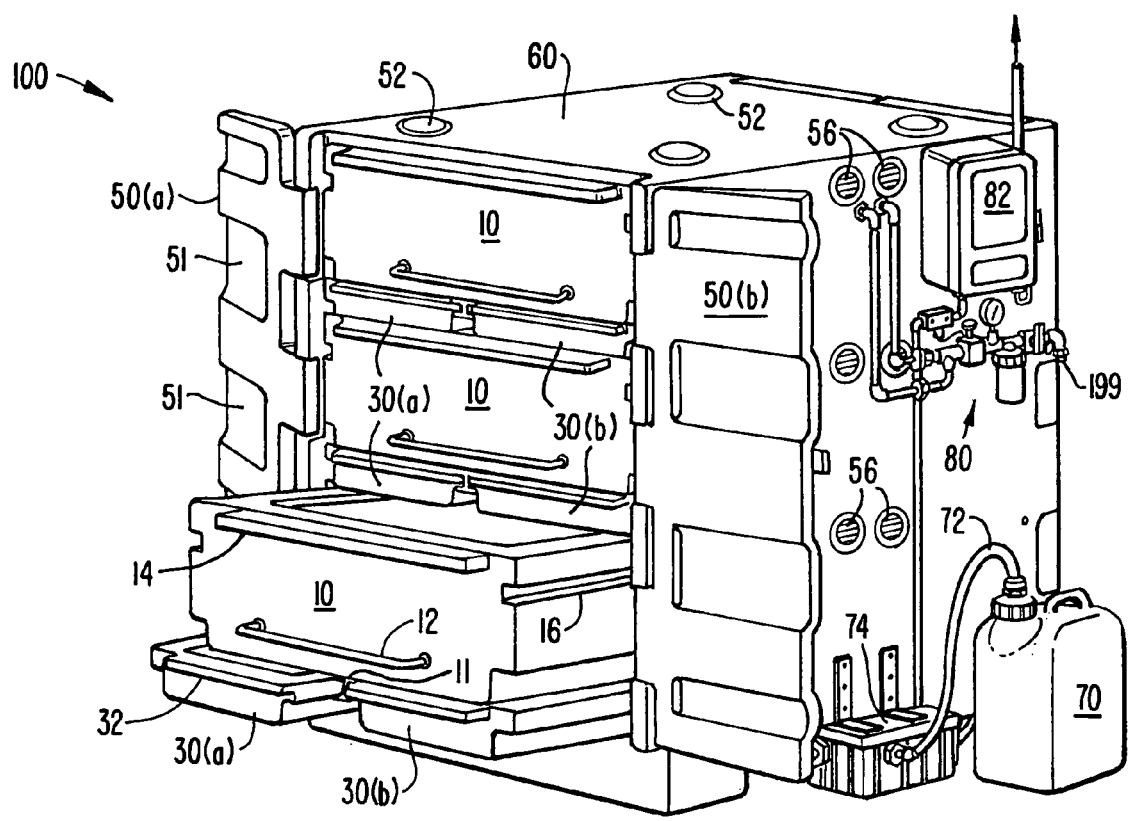
FIG. 1 shows a perspective view of a composting apparatus according to an embodiment of the invention.

Embodiments of the invention can be used at any suitable facility. For example, embodiments of the invention could be used in schools, grocery stores, day care centers, restaurants, zoos, jails, military bases, hospitals, cafeterias, farms, and multi-family housing units. Embodiments of the invention can be designed to process substantially all of the organic waste produced by a facility while occupying minimal space at the facility. Large amounts of high quality organic product can be produced at the facility using embodiments of the invention. The organic product can be used at the facility or could be used elsewhere.

Any suitable compostable material can be composted in embodiments of the invention. Examples compostable material include organic waste such as pre and post consumer food waste, low grade paper waste, food contaminated paper waste, agricultural waste including manure and crop residuals, municipal biosolids, and industrial organic sludge.

A typical composting apparatus according to an embodiment of the invention includes a housing and a plurality of composting containers in the housing. The composting containers can be composting drawers that can be pulled out so that organic waste (e.g., shredded food) can be placed in the composting drawers. The composting drawers are in a stacked relationship in the housing. Each drawer includes a bottom region having a plurality of apertures.

Each of the drawers can contain any suitable type of organism that is capable of composting organic waste. Worms are used in "vermicomposting" processes and can be in the each of the composting drawers in the composting apparatus. In a vermicomposting process, worms such as redworms (e.g., *Eisenia Fetida*) break down organic matter by ingestion and digestion. Of course, any other type of living biological organism may be used to decompose the organic waste instead of or in addition to worms. Suitable biological organisms are known to those of ordinary skill in the art.

Receiving structures are also in the housing. Each receiving structure is positioned under a composting drawer and receives composted material from the composting drawer above it. After agitating composted material within a drawer, the agitated composted material within the drawer passes through the apertures at the bottom region of the drawer and into one or more receiving structures under the drawers. Each of the drawers and the receiving structures may have finger grips or other grippable structures to allow a user to easily pull the drawers out.

Prior to placing organic waste in the composting apparatus, the organic waste can be pre-processed in some manner. For example, it is desirable to shred or grind raw organic waste such as waste food before composting it. Processing organic waste into finer pieces decreases the processing time of the organic waste by making it easier for the composting organisms to ingest and digest the organic waste. Both unprocessed and pre-processed organic waste can be considered compostable material.

After the compostable material is obtained (unprocessed or pre-processed), the compostable material is deposited into each of the drawers. The compostable material is deposited in the drawers on top of material that is already in the process of being composted. Thus, "fresh" compostable material typically resides at the top of each drawer. During the composting process, macro-organisms such as worms tend to migrate toward the top of each drawer to access the fresh compostable material. The worms process the organic waste and leave behind a composted material, which passes downward into the drawer over time.

Composted material is harvested from the bottom region of each drawer. In embodiments of the invention, composted material at the bottom region of each drawer can be harvested using a breaker device. In one embodiment, the breaker device includes a handle coupled to a grid that resides at the bottom of the drawer in which the grid is present. The user manipulates the grid by moving the handle back and forth (e.g., by pushing and pulling). This action agitates the composted material and causes it to fall through the apertures at the bottom region of the drawer. The agitated composted material passes through the apertures and into one or more receiving structures (e.g., trays) positioned underneath the drawer.

After removing, for example, the bottom 1 inch of composted material in a composting drawer, all material in the drawer moves downward. Space is then created at the top of the drawer. Once more space is available at the top of the drawer, new uncomposted material can be deposited within the drawer to fill the space. In some embodiments, it might take about 3 weeks (or less) for compostable material that is put at the top of a drawer to pass out of the bottom region of the drawer as composted material.

Once the composted material is received into the one or more receiving structures, it can be transferred to a garden where the composting apparatus is located. Alternatively, it can be bagged and sold.

The obtained composted material is a highly useful product. For example, the composted material can be used to grow plants. It can enhance seed germination, increase flowering, suppress plant disease, increase yields and boost beneficial microbial populations of the soil.

The composting process performed by the composting apparatus can be considered a "continuous flow process". Organic waste is placed in each drawer, for example, every other day. Composted material can be harvested, for example, every day or every other day. Accordingly, in embodiments of the invention, organic waste can be frequently and regularly fed to the composting apparatus and composted material can be regularly and frequently generated by the composting apparatus.

FIG. 1 shows a composting apparatus 100 according to an embodiment of the invention. The composting apparatus 100 includes a housing 60 that is sized to house a plurality of composting drawers 10 and a plurality of receiving structures 30(a), 30(b). The housing 60 may be made of a weather-proof plastic material. One or more sets of doors 50(a), 50(b) can be coupled to the housing 60. These doors 50(a), 50(b) may open or close to prevent or provide access to the drawers 10 and the receiving structures 30(a), 30(b). Recessed regions 51 in the doors 50(a), 50(b) can be shaped to contain the handle 12 of a breaker device, as well as the finger grips 14, 32 of the drawers 10 and the receiving structures 30(a), 30(b).

The housing 60 and the composting apparatus 100 may have any suitable dimensions. For example, in some embodiments, the housing 60 can be less than about 5 feet tall. The length and the width of the housing 60 may also each be less than about 5 feet wide. Dimensions such as these allow a person of average height to use the composting apparatus 100. For example, in embodiments of the invention, the user need not obtain a ladder or stepping stool to open a drawer or receiving structure, or to fill a drawer with compostable material. Despite its relatively small size, the composting apparatus 100 can have higher compost production rates than similarly sized apparatuses. For example, unlike the above described conventional apparatuses, composted material can be obtained from six separate processing regions (e.g., six drawers) in embodiments of the invention rather than just one processing region.

In embodiments of the invention, the plurality of drawers 10 may be stacked. The plurality of receiving structures 30(a), 30(b) may also be stacked. As shown, pairs of receiving structures 30(a), 30(b) are stacked and interspersed between adjacent drawers 10. Two or more receiving structures 30(a), 30(b) per drawer 10 are preferably used to decrease the weight of composted material that the user needs to transport or handle at any given time.

Embodiments of the invention may have any suitable number of drawers and receiving structures. For example, although two receiving structures 30(a), 30(b) are shown under each drawer 10 in FIG. 1, in other embodiments, there may be only one receiving structure under only one drawer. In another example, although three drawers 10 and six receiving structures 30(a), 30(b) are shown in the embodiment in FIG. 1, in other embodiments, there may be more or less drawers and receiving structures in the composting apparatus.

Protruding regions 52 are at the top of the housing 60. The protruding regions 52 can be used to help align similar or different composting apparatuses so that may be stacked on top of each other. For example, another similarly configured composting apparatus (not shown) with recessed regions on the bottom of the housing may be stacked on top of the composting apparatus 100 shown in FIG. 1. The protruding regions 52 of the composting apparatus 100 can be inserted into the recessed regions of the other composting apparatus to properly align the two stacked composting apparatuses. The protruding regions 52 also allow the composting apparatuses to be stacked to allow for easy transport and storage of the apparatuses.

Each drawer 10 may include a finger grip 14 and each receiving structure 30(a), 30(b) can also include a finger grip 32. The finger grips 14, 32 allow a user to pull out the drawers 10 and the receiving structures 30(a), 30(b). In a typical example, the finger grips 14, 32 can be overhanging structures that extend out from the front wall of the drawer 10 about 1 inch or more. In other embodiments, handles can be attached to front walls of the drawers 10 and the receiving structures 30(a), 30(b) instead of the finger grips 14, 32.

Each drawer 10 may have any suitable characteristics or dimensions. For example, each composting drawer 10 can have a bottom region, generally parallel front and rear walls, generally parallel side walls, and an open top region. The front wall, the rear wall, and the generally parallel side walls may form a region where compostable material is received and composted material is produced. In some embodiments, each drawer 10 may be about 12 inches deep (or more less than this depth). Also, each drawer 10 may also be made of any suitable material including plastic or metal.

Although the walls and the bottom region of the drawer 10 are illustrated as being generally rectangular, the walls and the bottom region of the drawer can have any suitable geometry. For example, the walls of a drawer could be curved in embodiments of the invention.

The bottom region of each drawer 10 may include a plurality of apertures. Each aperture in the plurality of apertures may be sized to permit composted material to pass through it. In some embodiments, each aperture may have a maximum dimension less than about 5 inches. For example, the length, the width, or diameter of an aperture may be less than about 5 inches. Each aperture may have any suitable geometry including a circular or rectangular geometry. Also, the apertures in the plurality of apertures may be disposed in a regular or irregular array. The average aperture pitch may be of any suitable value (e.g., less than about 10 inches). Further details about exemplary drawers are provided below.

Each of the receiving structures 10 may also include any suitable characteristics. For example, in the illustrated embodiment, each of the receiving structures 30(a), 30(b) are in the form of a shallow tray with a front region, side regions, a rear region, and a bottom region. In some embodiments, the receiving structures can have a depth of about 3 inches (or more or less than this amount). The bottom regions and the side regions of each of the receiving structures 30(a), 30(b) can be substantially impermeable. However, some holes can be present at the bottom regions or the side regions of the receiving structures 30(a), 30(b) to allow the passage of water out of the receiving structures 30(a), 30(b). Preferably, holes are at the bottom region at the rear of each receiving structure 30(a), 30(b) so that liquid waste flows away from the user. In this regard, each receiving structure 30(a), 30(b) can be tilted downward and inward so that liquid waste flows towards the interior of the housing 60.

In the example shown in FIG. 1, two receiving structures 30(a), 30(b) may be under each composting drawer 10. A support structure 11 in the form of an "I" bar may be secured to the bottom of the drawer 10. The support structure 11 and ledges (not shown) on a wall on the housing 60 can be used to support lateral edges of the receiving structures 30(a), 30(b). The support structure 11 can be integrally formed with the drawer 10 to which it is attached or could be formed separately and attached to a drawer (e.g., using screws or bolts).

As will be discussed in further detail below, a spacer element (not shown) may be at the end of each drawer 10. When a drawer 10 is pulled out, the spacer element can pull the receiving structures 30(a), 30(b) underneath the drawer 10 along with the drawer 10. This advantageously prevents or minimizes the composted material in the drawer 10 from falling onto the floor when the drawer 10 is pulled out.

The composting apparatus 100 may also include various pumping systems and climate control systems to facilitate proper composting. For example, the composting apparatus 100 shown in FIG. 1 includes a bilge pump 74, a waste container 70, and a hose 72 connecting the bilge pump 74 and the waste container 70. The bilge pump 74 can pump out liquid waste out of the housing 60. The bilge pump 74 can be independently controllable, or may be controlled by some other device (e.g., the controller box 82). In addition, a water system 80 is on the side of the housing 60 and includes one or more pressure gauges, pipes, and filters. The water system 80 may have a hose connector 199. A hose (not shown) such as a garden hose may be coupled to the hose connector 199 and may supply water to the composting apparatus 100. Water at any suitable pressure (e.g., 40 to 75 pounds per square inch) may be supplied to the composting apparatus 100 via the hose connector 199. Vents 56 may be provided in the housing 60 to ventilate the interior or the housing 60.

Suitable electronics can be in the control box 82 that is coupled to the housing 60. The control box 82 can be used to control the water system 80 to provide water (e.g., mist) to the material in the drawers 10. Temperature controls 82 can also be present in the housing 60 to regulate the temperature of the interior of the housing 60. An electrical supply (e.g., 117 VAC, 60 Hz, 0.20 Amps) (not shown) can supply electrical power to the control box 82. The control box 82 can be programmed to deliver water, pump out waste liquid, and/or control the internal temperature according to predetermined times and quantities. A clock and timer may be included in the control box 82 to help change the amount of water delivered to the compostable material in the drawers, the waste pumped out of the housing (the waste water is not on a timer, it is based upon water level, over a certain water level the pump will automatically turn on and pump out all the water in the pump's reservoir,) or control the internal temperature of the housing according to a predetermined schedule. Control boxes and control systems are commercially available and can be implemented by those of ordinary skill in the art.

A breaker device is coupled to each drawer 10. Each breaker device can include a handle 12 and a grid (not shown) that is disposed inside of each drawer 10. In this example, a portion of the handle 12 lies outside of the drawer 10 and the grid lies entirely inside of the drawer 10. A user can pull and push the handle 12 to manipulate the breaker device. The pulling and pushing motion moves the grid inside of a drawer 10 to agitate the composted material at the bottom of the drawer 10. The agitated composted material passes through the apertures at the bottom region of the drawer 10 and into the receiving structures 30(a), 30(b) below the drawer 10. Although the breaker device has been described as being operated manually, in some embodiments, the breaker device can be automatically operated. For instance, one or more linear actuators (not shown) could be used to manipulate the handles 12 of each of the breaker devices. Of course, any suitable manipulating mechanism can be used to move the breaker device.

Figure 2:
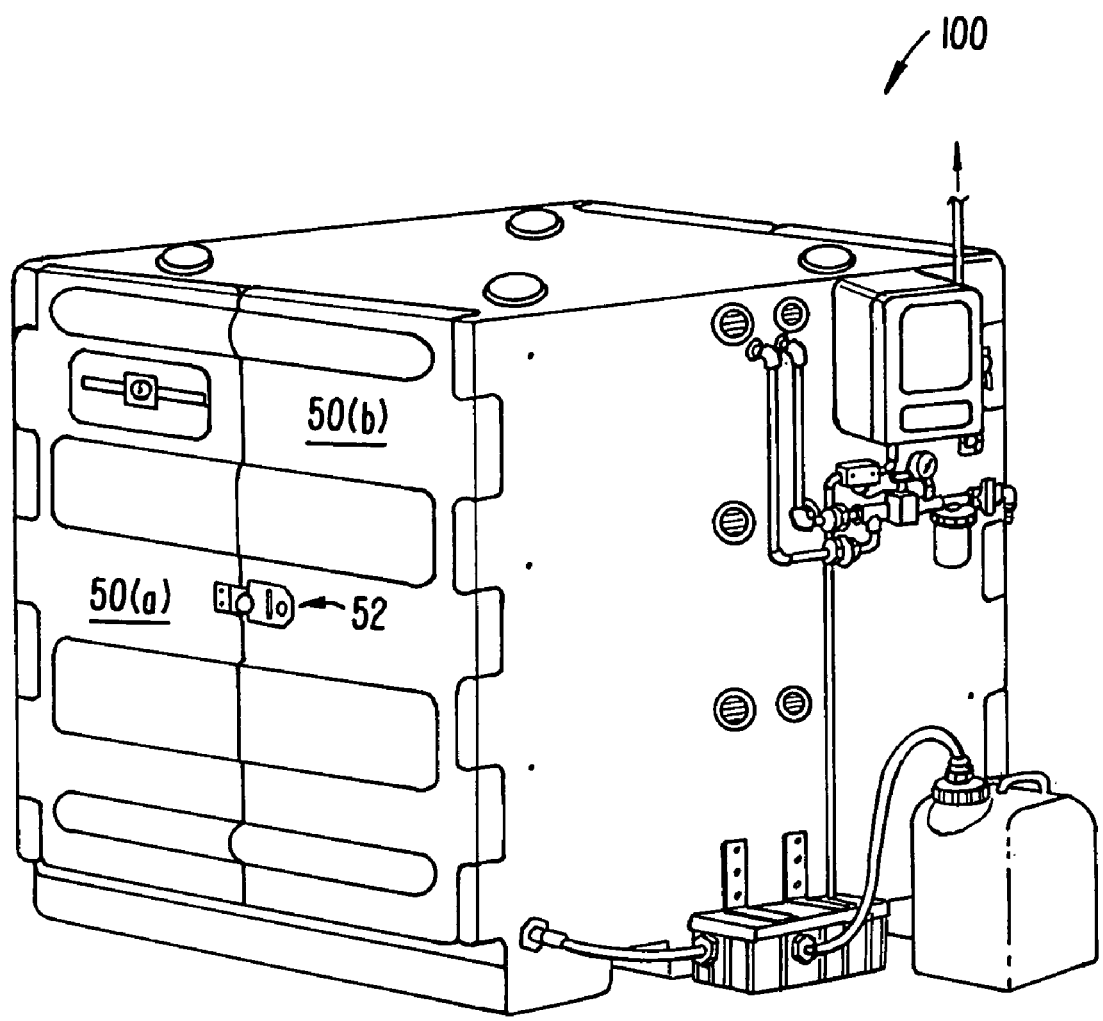
FIG. 2 shows a perspective view of the composting apparatus in FIG. 1 with its doors closed.

FIG. 2 shows the composting apparatus 100 shown in FIG. 1, except that in this Figure, the doors 50(a), 50(b) are closed and are secured together by a lock 52. The closed housing 60 prevents various animals from accessing the interior of the composting apparatus 100. Birds, for example, may try and eat any worms in the drawers of the composting apparatus. In another example, dogs, cats, or bears may try and access any edible organic waste (e.g., food scraps) in the drawers of the composting apparatus. Accordingly, it is desirable to prevent access to the drawers in the composting apparatus to animals.

Figure 3:
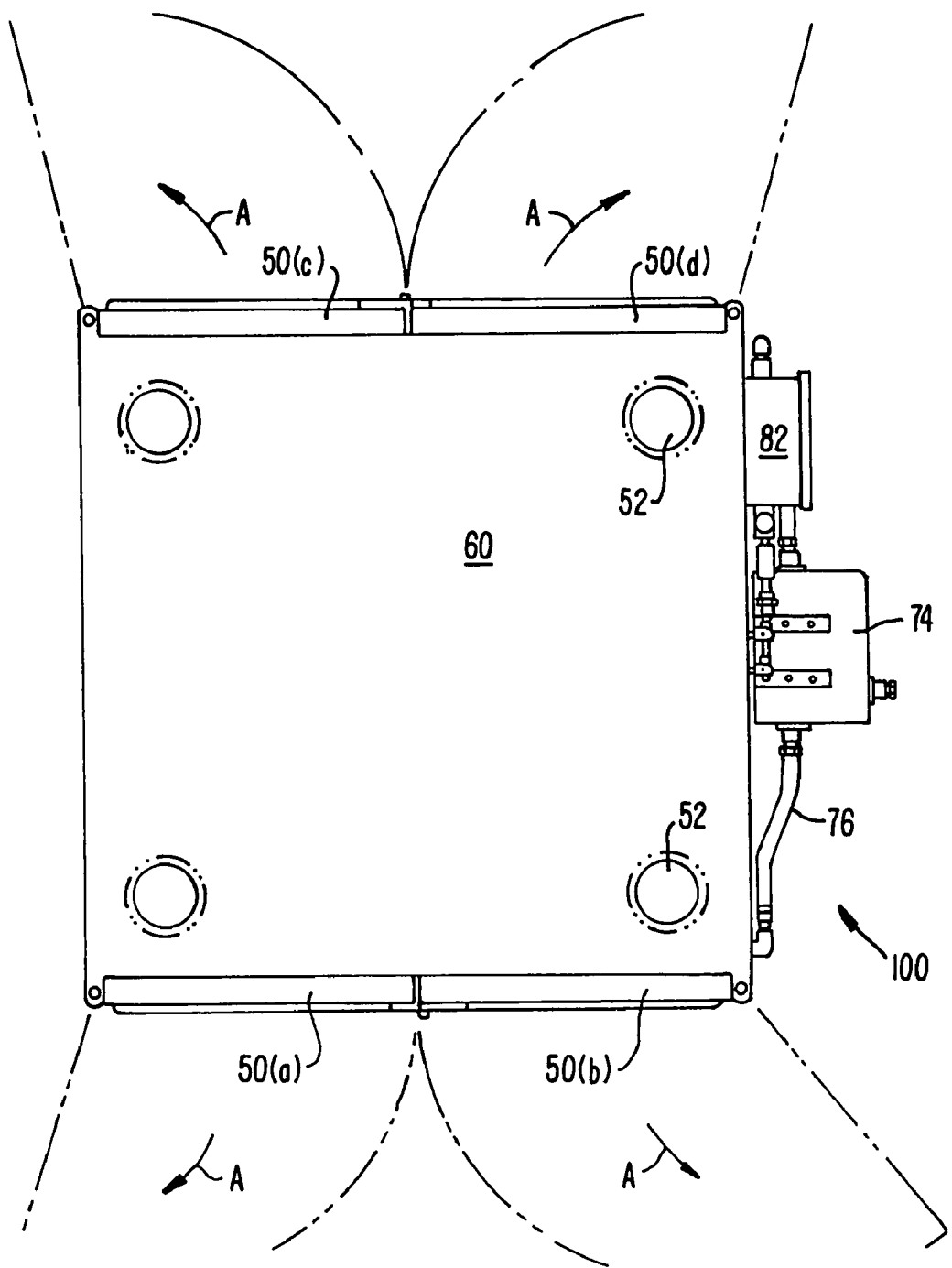
FIG. 3 shows a top view of a composting apparatus according to an embodiment of the invention.

FIG. 3 shows a top view of the composting apparatus 100. In FIG. 3, a first set of doors 50(a), 50(b) and a second set of doors 50(c), 50(d) are in the composting apparatus 100. The doors 50(a)–50(d) swing open in the direction of the arrows A. The first and second sets of doors are at opposite ends of the composting apparatus 100. Drawers (not shown) and receiving structures may be accessed at the opposite ends of the composting apparatus 100 so that the drawers may open in opposite directions. In other embodiments, there could be only one set of drawers that open in one direction, as opposed to have two sets of drawers that open in opposite directions.

Figure 4:
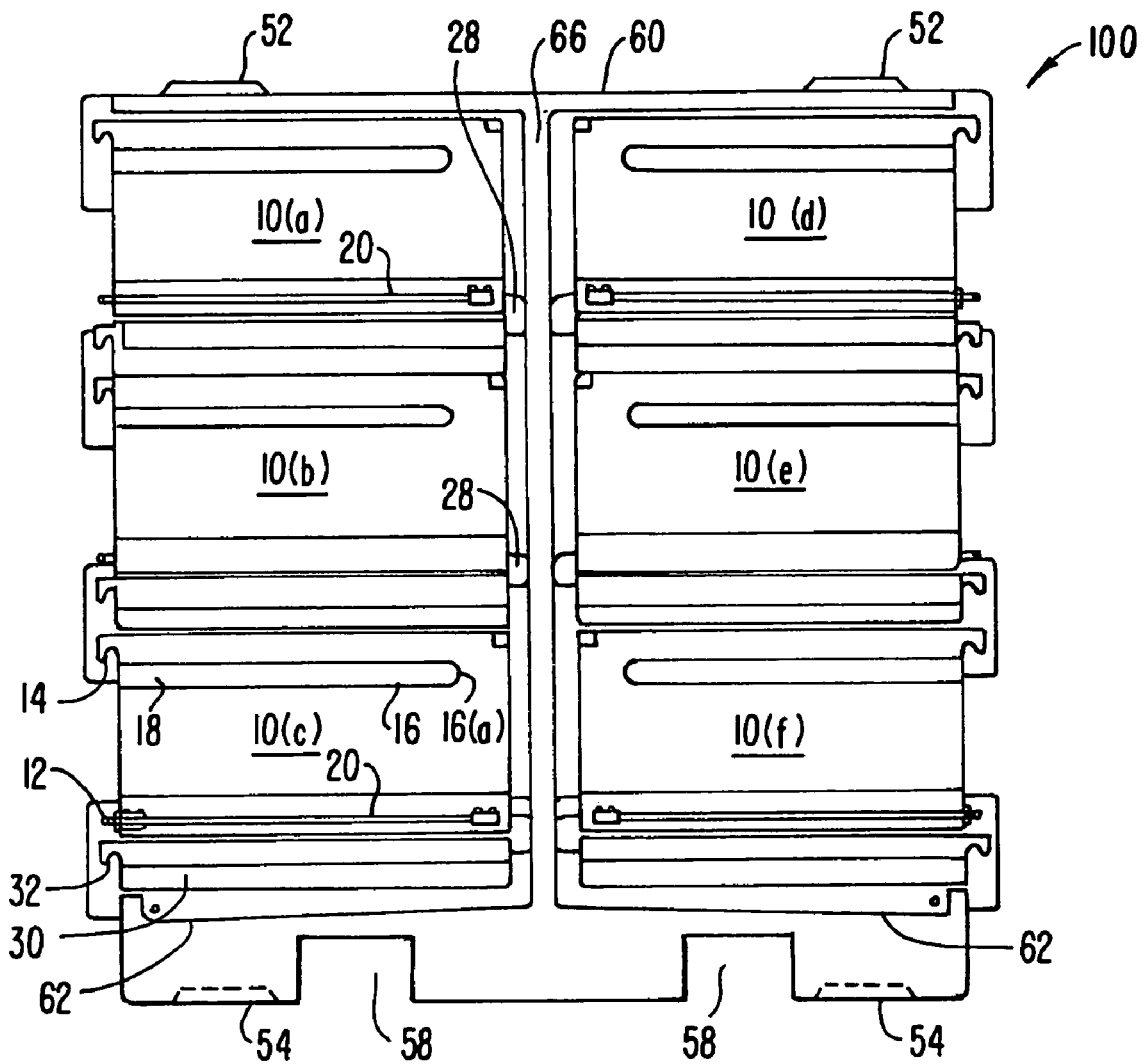
FIG. 4 shows a side cross-sectional view of a composting apparatus according to an embodiment of the invention.

FIG. 4 shows a side cross-sectional view of a composting apparatus 100 according to an embodiment of the invention. The composting apparatus 100 includes a housing 60. The housing 60 includes an inner wall 66 and inner bottom regions 62. The inner wall 66 can divide the housing 60 into two inner spaces and may be permeable or impermeable. Each defined inner space contains a set of drawers, and each set of drawers in this example has three drawers. The inner bottom regions 62 of the housing 60 may be sloped downward in an outward direction so that any waste liquid (e.g., waste water) can flow toward common liquid outlets in the housing 60.

The composting apparatus 100 includes a first set of drawers 10(a)–10(c) and a second set of drawers 10(d)–10(f). The drawers in the first set of drawers 10(a)–10(c) and the drawers in the second set of drawers 10(d)–10(f) may face in opposite directions. One or more receiving structures 30 may be underneath each of the drawers 10(a)–10(f). Each of the drawers 10(a)–10(f) may include finger grips 14 to allow users to pull the drawers 10(a)–10(f) open. The receiving structures 30 may also have finger grips 32. When each drawer 10(a)–10(f) is pulled out, a stop element 18 on the inner wall of the housing 60 can pass within a channel 16 in the drawer 10(a)–10(f) until the channel end 16(a) contacts the stop element 18. This stops the drawers 10(a)–10(f) from coming completely out of the housing 60 when they are pulled out. The stop element 18 could be, for example, a screw or protrusion that extends inwardly into the housing. Any suitable drawer stopping mechanism may be used in embodiments of the invention.

As noted above, a breaker device is associated with each drawer 10(*a*)–10(*f*). Each breaker device includes a handle 12 and a grid 20, and each breaker device is coupled to one of the drawers 10(*a*)–10(*f*). The handle 12 of each breaker device may be U-shaped and may pass through holes in the front wall of the drawer to which it is attached. Each grid 20 has lateral dimensions that are smaller than the lateral dimensions of the bottom region of the drawer in which it is disposed. The handle 12 can be manipulated to move the grid 20 back and forth.

The breaker device used in embodiments of the invention is not limited to devices with a handle and a grid. For example, the breaker device could be an agitation mechanism such as an elongated bar that slides across the bottom of a drawer. In another example, the grid could be a solid plate that the user pushes and pulls across the bottom region of a drawer. However, the breaker device used in preferred embodiments includes a grid. Also, in other embodiments, the breaker device need not be used with stacked drawers in a composting apparatus. For example, the breaker devices according to embodiments of the invention could be used with composting containers that are not stacked on each other.

Each drawer 10(*a*)–10(*f*) may include a spacer element 28 at the rear of the drawer. Each spacer element 28 may be integrally molded with each drawer 10(*a*)–10(*f*) or may be separate elements that may be attached to the rear walls of the drawers 10(*a*)–10(*f*). For example, spacer elements could be separately formed and attached to the rear walls of the drawers 10(*a*)–10(*f*) with coupling elements such as screws, glue, etc. Regardless of the form of the spacer elements 28, the spacer elements 28 space the rear walls of the drawers 10(*a*)–10(*f*) from the interior wall 66 of the housing 60.

Liquid waste (e.g., from the receiving structures 32) can pass down to the bottom of the housing 60 by passing between the rear walls of the drawers 10(*a*)–10(*f*) and the inner wall 66 of the housing 60. Liquid such as water can pass from each drawer 10(*a*)–10(*f*) to the receiving structures 30 underneath the drawer 10(*a*)–10(*f*). Each of the receiving structures 30 may be tilted slightly downward and inward. Any excess liquid in the receiving structures 30 passes in the space between the rear walls of the drawers 10(*a*)–10(*f*) and the inner wall 66 of the housing 60. Also, as noted above, the spacer elements 28 pull receiving structures 30 underneath the drawers 10(*a*)–10(*f*) when the drawers 10(*a*)–10(*f*) are pulled out. As a result, composted or compostable material within the drawers 10(*a*)–10(*f*) does not fall to the ground when they are pulled out of the housing 60.

The composting apparatus 100 shown in FIG. 4 also includes a number of recessed portions 54 at the bottom. The recessed portions 54 can receive protruding portions on another composting apparatus (not shown) that may be similar to the protruding portions 52 at the top of the composting apparatus 100 shown in FIG. 4. In this way, stacked composting apparatuses can be properly aligned for efficient and safe stacking. Thus, the composting apparatus according to embodiments of the invention may be stacked and arranged in any suitable manner to form a composting system. Accordingly, if the user wants to increase the composting production rate, more than one composting apparatus can be obtained and these composting apparatuses may be placed side-by-side or may be stacked on top of each other as desired by the user and as will be permitted by the available space at the facility. For example, if lateral space is not available at a facility but vertical space is available, the composting apparatuses 100 can be stacked on top of each other to any suitable height.

Lift channels 58 may be provided at the bottom of the composting apparatus 100. These lift channels 58 may receive the ends of a forklift or other transport apparatus so that the composting apparatus 100 can be transported. Lifting the composting apparatus 100 may be needed in the event that the composting apparatus 100 is moved or is stacked on another composting apparatus.

The particular arrangement of drawers and receiving structures shown in FIG. 4 maximizes space, while limiting the volume of material within each drawer 10(*a*)–10(*f*). Limiting the volume of material in each drawer 10(*a*)–10(*f*) is desirable. By limiting the volume of material in each drawer, the weight of material in each drawer is also limited so that each drawer can be easily manipulated by a user without specialized machinery.

Although FIG. 4 shows a composting apparatus 100 with two sets of drawers 10(*a*)–10(*c*), 10(*d*)–10(*f*) facing in opposite directions, other embodiments are also possible. For example, in some embodiments, there could be only one set of drawers (e.g., only drawers 10(*a*)–10(*c*)) facing in one direction) or there could be more or less than three drawers per set of drawers.

Figure 5:
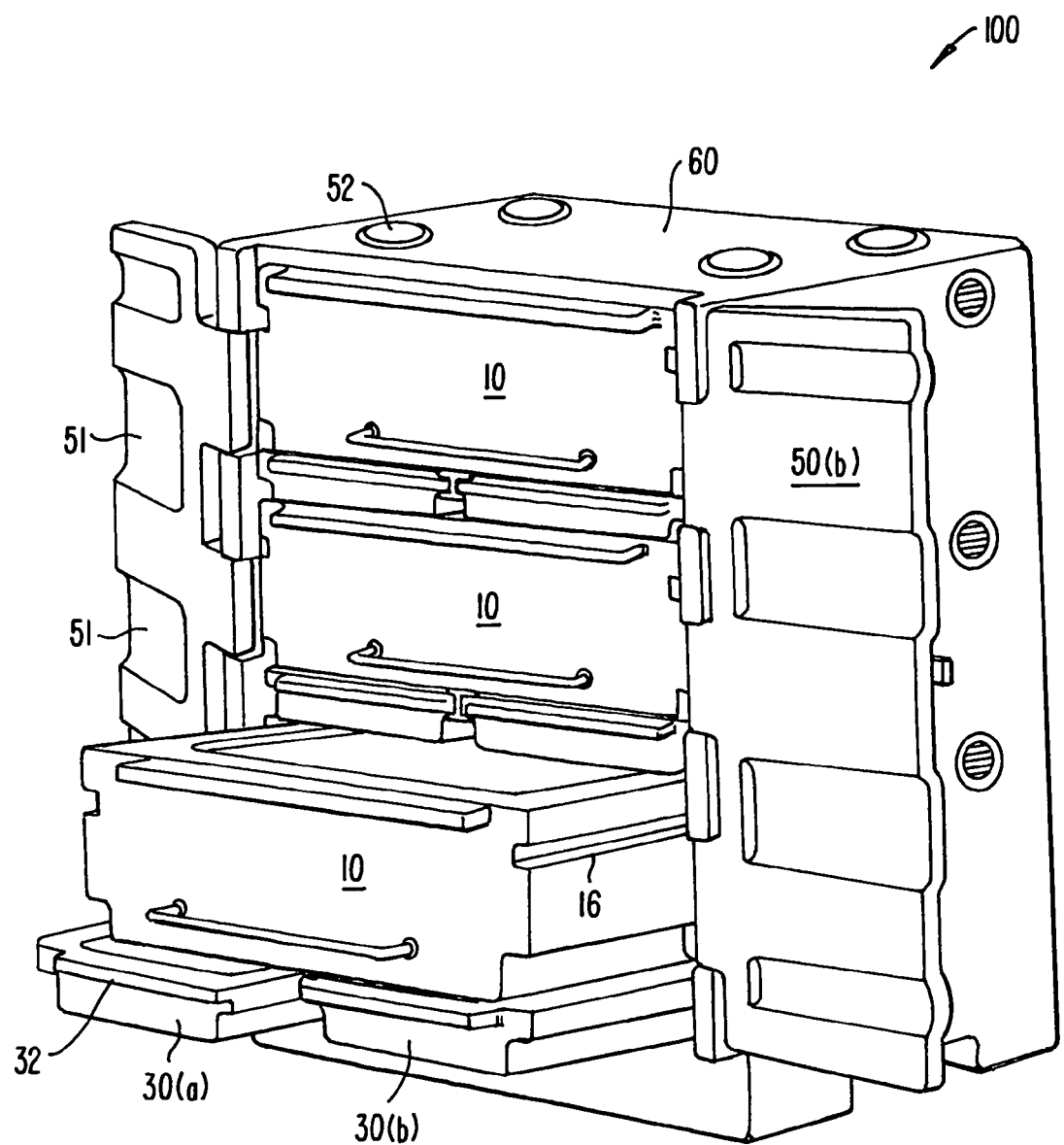
FIG. 5 shows a perspective view of another composting apparatus according to another embodiment of the invention.

FIG. 5 shows a composting apparatus 100 with one set of drawers that open in a single direction. In FIG. 5, like numerals identify like elements as in the previously presented FIG. 1. However, in this embodiment, the housing 60 is smaller than the housing in FIG. 1 since there are fewer drawers in this embodiment.

Figure 6B:
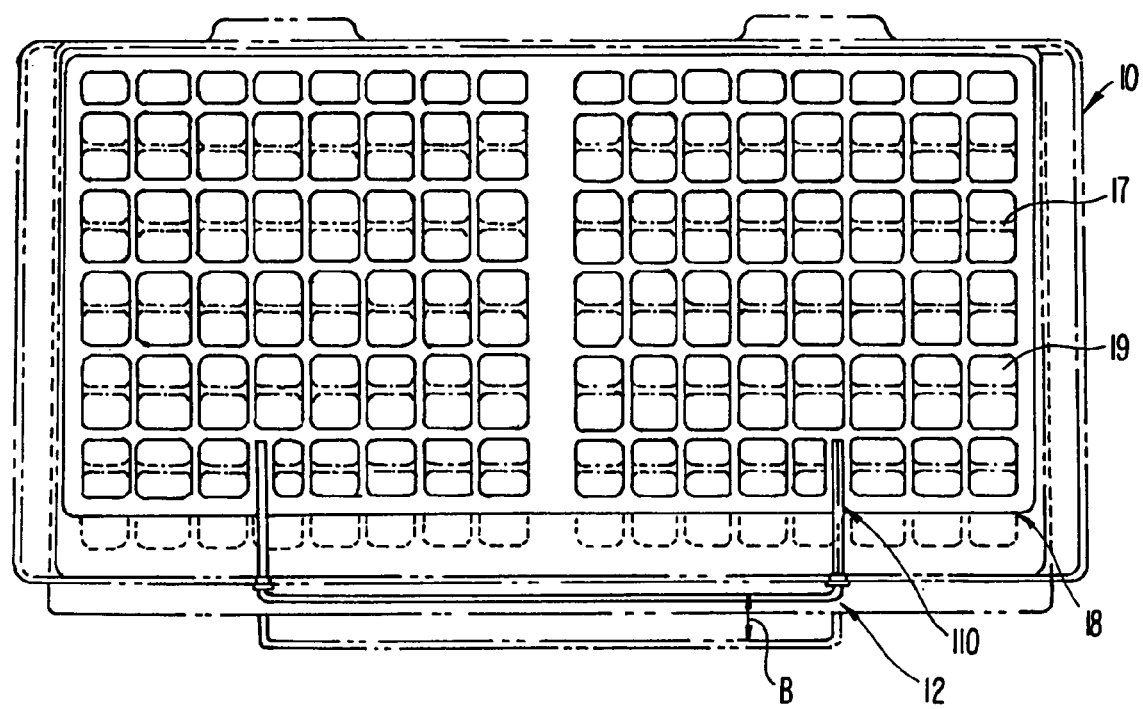
FIG. 6(b) shows a top view of a breaker device and a composting drawer. The composting container is shown by invisible lines.

FIG. 6(*a*) shows a top view of a drawer according to an embodiment of the invention. The drawer 10 includes spacer elements 28 at the rear of the drawer and a finger grip 14 at the front of the drawer 10. A plurality of apertures 18 is at a bottom region 17 of the drawer. Raised side regions 15 surround the bottom region 17 to form an area where compostable and composted material may reside. Holes 29 are provided in the drawer's front wall 31. Portions of the handle of a breaker device can pass through the front wall 31 of the drawer. A wider portion 89 in the bottom region 17 extends from the front to the back of the drawer 10. The wider portion 89 is wider than other portions of the bottom region 17 and provides the drawer 10 with structural support. A support structure (not shown) can be under the wider portion 89 and can support a receiving tray (not shown) underneath the drawer 10.

FIG. 6(*b*) shows a top view of a breaker device according to an embodiment of the invention. A drawer 10 in which the breaker device is in is shown by invisible lines. The breaker device includes a grid 18 and a handle 12. The handle 12 may be secured to the grid 18 with coupling elements 110, and maybe made of metal or plastic. The coupling elements 110 may be, for example, screws, bolts or rivets. The handle 12 may be U-shaped or any other suitable shape.

The grid 18 may be made of metal or plastic (e.g., polypropylene). The grid 18 may have any suitable thickness (e.g., more or less than about 0.5 inches) and can have lateral dimensions less than the lateral dimensions of the bottom region of the drawer in which it is situated. For example, the grid 18 can have a side-to-side dimension that is substantially the same as the side-to-side dimension of the bottom region of a drawer. This limits the lateral movement of the grid 18 as the user pushes and pulls the breaker device. The front-to-back dimension of the grid 18 is less than the front-to-back dimension of the bottom region of the drawer 10. For example, the front-to-back length of the drawer 10 can be more than about 2 inches greater than the front-to-back length of the grid 18. In this example, the user can push and pull the breaker device with a two inch stroke to agitate the composted material in the drawer 10.

A user can operate the breaker device by moving the breaker device back and forth as shown by the arrow B. This movement agitates the composted material that is present at the bottom of the drawer 10 (shown by invisible lines). As the composted material is agitated, the composted material falls through the apertures 19 in the drawer 10. When the breaker device is not being used, the bottom region of the drawer and the grid overlap to form a less permeable structure (i.e., than either the bottom region or the grid alone). Together, the overlapping bottom region and grid support the composted and compostable material within the drawer.

Using a grid to agitate composted material has a number of advantages over using a single bar to agitate composted material. For example, the grid has a greater surface area than a single bar. Accordingly, less effort is needed to move the grid than the single bar when agitating the same area of composted material. For example, a simple push and pull motion can agitate the composted material using a breaker device. In comparison, a person may need to turn a crank more than 10 times to agitate a composted material in a conventional apparatus. Moreover, the grid provides additional structural support for the composted or compostable material that resides within a drawer. This allows for a more even and flat distribution of composted material within the drawer. Without the grid, it is possible for the material within the drawer to "sag" or cave in if the apertures at the bottom of the drawer are too big. This might cause some of the material within the drawer to be harvested before it is ready.

Embodiments of the invention have a number of advantages. Compared to the above-described Worm Wigwam composting apparatus, the pushing and pulling action used in embodiments of the invention to agitate the composted material is much less labor intensive than turning a crank handle over and over again. The process of agitating the composted material and harvesting it is simple and does not require the use of complicated machinery. Moreover, compared to the Worm Wigwam, embodiments of the invention can have many processing regions (e.g., the bottom regions of six drawers) where composted material can be harvested instead of one. This results in a greater compost production rate, without increasing the amount of space occupied by the composting apparatus. For example, if the composting apparatus has six drawers with bottom regions, each bottom region having about 8 square feet of area, the area for the bottom regions of six drawers may total about 48 square feet. If 1 to 2 inches of composted material are harvested each day, this results in a compost production rate of about 4 to 8 cubic feet per day. This product rate is significantly higher than the production rate that can be achieved by the Worm Wigwam. In addition, unlike the Worm Wigwam, embodiments of the invention are more compact and can be stacked. A composting system can be formed to conform to the available space at a particular facility. The drawers also provide the user with easy access to the composting region of the composting apparatus so that the composting apparatus may be manually operated by even a single individual. Furthermore, the composting apparatuses according to embodiments of the invention can be used at, for example, schools to recycle organic waste such as food scraps from a school cafeteria. The composting apparatuses can be used as both a practical means for disposing of organic waste while also being an educational tool. For instance, at a school, students can use the composting apparatuses to learn about environmentally sound waste conversion processes and biology.

Methods of creating compostable material and methods of loading the compostable material into a compost apparatus can be described with reference to FIGS. 1, 7 and 8.

Figure 7:
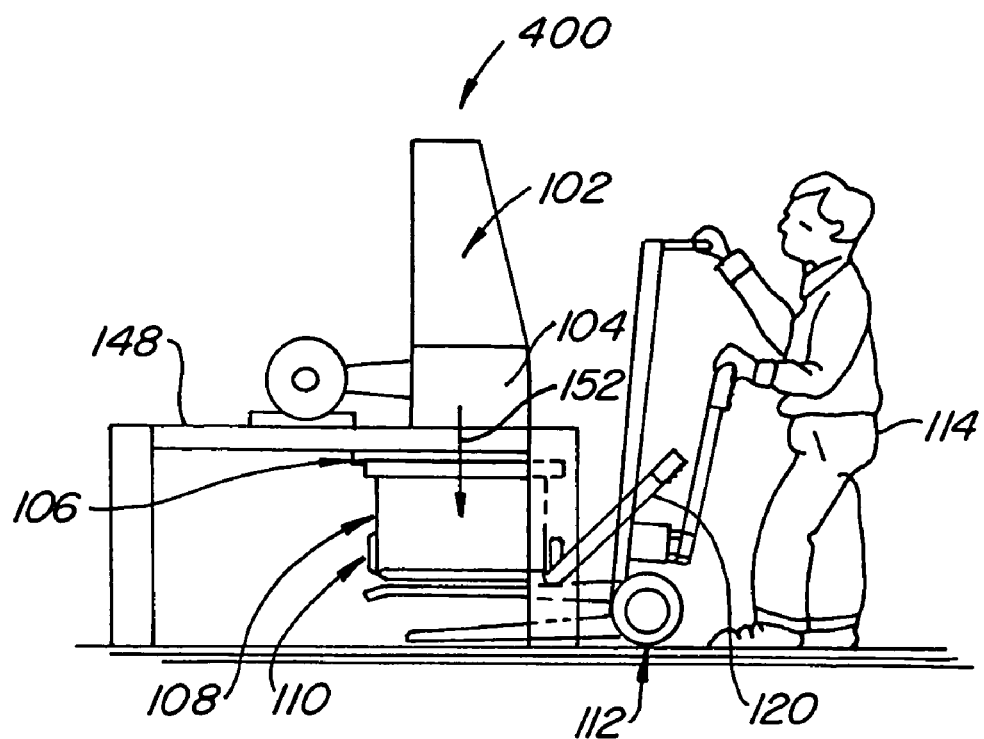
FIG. 7 shows a schematic diagram of how one would load shredded organic waste into a transport container.

FIG. 7 shows a user 114 using a waste processing apparatus 400. The waste processing apparatus 400 may be used, for example, to process organic waste into finer particles. The waste processing apparatus 400 includes a hopper 102 and a shredder 104.

In FIG. 7, a transportable container 108 is temporarily coupled to guides 106 of a table 148. The transportable container 108 includes a flap door 110 at the bottom side region of the transportable container 108. A latch (not shown) can secure the flap door 110 so that it is closed when the transportable container 108 is used to transport compostable material.

In use, organic waste is dumped into the hopper 102 and is shredded by the shredder 104. The shredded organic waste then passes to the transportable container 108 underneath the table 148. After the transportable container 108 is full, the user 114 uses a hand lift truck 112 to lift and transport the transportable container 108. A tilting device 120 may be under the transportable container 108 and on or coupled to the hand lift truck 112. The transportable container 108 is then transferred to a composting apparatus 100 like the one shown in FIG. 8. Later, after tilting the transportable container 108, a vibrator can be used to provide even metering of the waste material.

Before placing the shredded organic waste into the composting apparatus 100, composted material in the composting apparatus 100 is harvested. The user 114 opens the doors 50 of the composting apparatus 100. The handle 12 of the breaker device associated with the drawer 10 can then be manipulated while the drawer 10 and the receiving structure 30 are in the housing 60. For example, the user 114 can push and pull the breaker device to agitate the material at the bottom of the drawer 10. The agitated material passes through apertures at the bottom of the drawer 10 and into the receiving structure 30 underneath the drawer 10. The total height of the material within the drawer 10 decreases by a corresponding amount to create space for new organic waste. Typically, about 1 to 2 inches of composted material is harvested in this manner.

After the composted material passes into the receiving structure 30, the receiving structure 30 can then be removed from the housing 60 and the composted material may be transferred to another location and used elsewhere (e.g., in a garden that is close by). The composting drawer 10 above the receiving structure 30 can remain in the housing 60 so that composted material in the drawer 10 does not fall to the ground. The emptied receiving structure 30 is then placed back into the housing 60.

Figure 8:
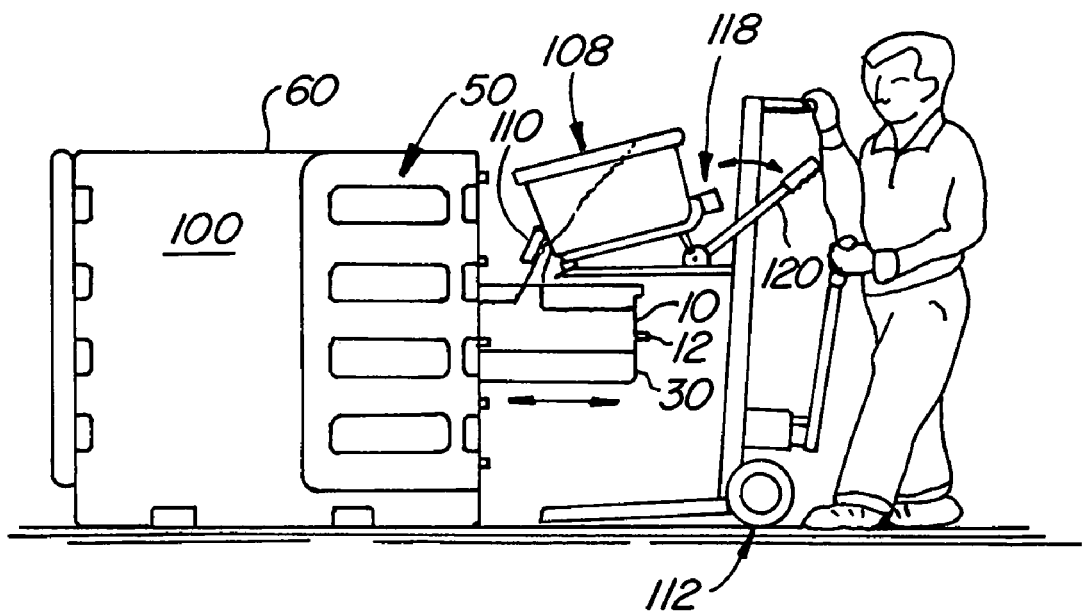
FIG. 8 shows a schematic diagram of how one would transfer shredded organic waste from a transport container to a composting drawer in a composting apparatus according to an embodiment of the invention.

Referring to FIG. 8, once the receiving structure 30 is emptied, the additional space that is created in the drawer 10 above the receiving structure 30 can be filled with new compostable material. In a typical process, the user 114 pulls out the drawer 10 in the composting apparatus 100. The receiving structure 30 underneath the drawer 10 may also come out along with the drawer 10. As noted above, a spacer element (not shown) at the rear wall of the drawer 10 may pull the receiving structure 30 out as the drawer is being pulled out. Since the receiving structure 30 is under the drawer 10, the receiving structure 30 catches any composted material that may happen to fall through the apertures at the bottom region of the drawer 10. This prevents or minimizes compostable material in the drawer 10 from inadvertently falling to the ground.

The transportable container 108 is then positioned over the open drawer 10 and the flap door 110 may be unlatched (if it was previously latched) by the user 114. The user 114 then manipulates a handle on the tilting device 120 to tilt the transportable container 108 forward so that the shredded waste inside the transportable container 108 passes through a passage previously covered by the flap door 110 and into the drawer 10. In some embodiments, the transportable container 108 may be tilted at an angle of about 25 to about 30 degrees with respect to a horizontal surface. A vibrator 118 coupled to the tilting device 120 can then vibrate the transportable container 108 to disturb the shredded organic material inside of the transportable container 108. Such vibrators are commercially available from Cleveland Vibrator Co., of Cleveland Ohio. A suitable vibrator from this company may be part no. 0.1-2, which operates using 110 VAC and weighs about 6 pounds. As a result of the vibration caused by the vibrator 118, the shredded organic material may then be evenly metered onto the top surface of the shredded organic material that is already in the drawer 10. The user 114 may deposit the shredded organic material from the front of the drawer 10 to the back of the drawer 30, or vice versa. It could also be loaded from left to right (or vice versa). After loading the drawer 10 with a compostable material 10, the drawer 10 and the receiving structure 30 underneath the drawer can be pushed back into the housing 60.

Loading the composting drawers in the composting apparatus with a hand lift truck, a tilting device, and a vibrator has a number of advantages. For example, using these devices, heavy lifting by the user is not required. Also, by using this combination of devices, an even layer of composted material can be placed in each drawer, thus providing for uniform strata of composted and uncomposted material within each drawer. Each stratum in the drawer is harvested at the proper time without some uncomposted material being harvested too early.

There are other ways to fill the drawer in the composting apparatus with compostable material. For example, in other embodiments, each drawer could be manually loaded with composted material. For instance, a shovel or an automated dispenser could be used to deposit compostable material within each drawer in a composting apparatus. Other receiving structures may be emptied and other drawers may be filled with compostable material in the same or different manner than the methods described above.

Figure 9:
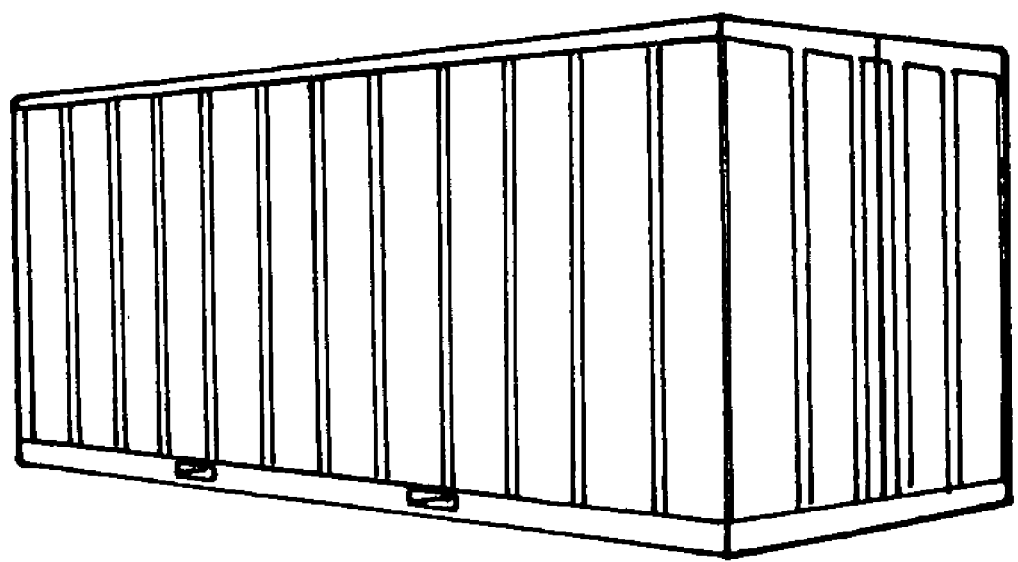
FIG. 9 shows a perspective view of a shipping container.

Yet other embodiments of the invention are directed to composting systems that use a shipping container to house the composting apparatus and also possibly other apparatuses such as the above-described waste processing apparatus (including a shredder). The shipping container could be of the type that is normally used in shipping goods overseas. When used to ship goods overseas, similar shipping containers can be stacked upon one another. An example of a suitable shipping container is shown in FIG. 9. As shown in FIG. 9, a suitable shipping container has doors (in this case at the end of the shipping container) that can be opened to access the interior of the shipping container. The doors to the shipping container could be at any location, for example, at one or more sides of the shipping container or at the ends.

The shipping container is essentially a pre-fabricated enclosure that can have a floor, ceiling, and walls. The shipping container can be easily transported on a ship or a truck. In addition, the shipping container can have any suitable dimensions. Typical shipping containers have dimensions of about 20 to about 40 feet long, about 8.0 feet wide, and about 8.5 feet tall. Of course, other shipping containers could have other dimensions. Suitable shipping containers are often made of a hard metal such as steel.

The shipping container can house any of the above-described and/or other apparatuses as well as a user who would use them. Thus, in some embodiments, each and every tool that would be needed to perform a composting process (e.g., a vermicomposting process) can be included in the shipping container. For example, the apparatuses shown in FIGS. 7 and 8, and the user could be present within a shipping container. The shipping container provides the user with shelter as the user processes compostable material and/or uses the composting apparatus. Climate control systems (e.g., heaters, air conditioners, humidifiers, etc.) may be provided along with the shipping container to maintain a suitable internal environment inside the shipping container. In addition, the shipping container can be insulated to help keep the interior climate of the shipping container constant.

Using a shipping container as a housing to house the various apparatuses used in the composting process has a number of advantages. For example, shipping containers are readily available and are inexpensive. Specialized housings need not be built to house the above-described apparatuses, thus saving time and expense. In addition, no building permits would be required to use the shipping container to house the composting and other apparatuses. Moreover, the shipping container provides security against, for example, vandals. The shipping containers used in embodiments of the invention can be easily locked so that vandals cannot access, for example, a shredder and a composting apparatus (e.g., with stacked drawers) within the shipping container. This adds to the longevity of the various apparatuses.

In the description above, many dimensions, geometries, and sizes are specifically described. However, it is understood other embodiments of the invention may have different dimensions or geometries.

While the foregoing is directed to certain preferred embodiments of the present invention, other and further embodiments of the invention may be devised without departing from the basic scope of the invention. Such alternative embodiments are intended to be included within the scope of the present invention. Moreover, the features of one or more embodiments of the invention may be combined with one or more features of other embodiments of the invention without departing from the scope of the invention. For example, any feature shown in FIGS. 1, 4, 6(*a*), and 6(*b*) can be used in the methods described with respect to FIGS. 7 and 8, or the shipping container in FIG. 9, without departing from the scope of the invention.

What is claimed is:

1. A composting apparatus comprising:
   a housing;
   a plurality of composting drawers in the housing, wherein said plurality of composting drawers are in a stacked relationship when in said housing, and wherein each of said drawers includes a bottom region having a plurality of apertures, wherein each of said plurality of drawers includes a spacer element that spaces a rear wall of the drawer from a portion of said housing and also extends in a downward direction so that when the drawer is pulled out, said spacer element pulls a receiving structure underneath the drawer; and
   a plurality of receiving structures in said housing, said receiving structures being respectively disposed under said plurality of composting drawers to receive composted material from aid plurality of composting drawers.

2. The composting apparatus of claim 1 further comprising a plurality of breaker devices, each of said breaker devices being adapted to agitate composted material at the bottom region of a composting drawer within the plurality of drawers.

3. The composting apparatus of claim 1, wherein said plurality of drawers includes a first set of drawers and a second set of drawers, wherein said first set of drawers and said second set of drawers open in opposite directions.

4. The composting apparatus of claim 1, further comprising a plurality of air vents in said housing, and a climate control system adapted to control the climate within said housing.

5. A composting system, comprising:
   at least two housings in a vertically stacked configuration;
   a plurality of composting drawers disposed in each of said housings, wherein said plurality of composting drawers are in a stacked relationship when in one of said housings, and wherein each drawer includes a bottom region having a plurality of apertures, wherein each of said plurality of composting drawers includes a spacer element that spaces a rear wall of said drawer from a portion of its respective housing and also extends in a downward direction such that when any of said drawers is pulled out, said spacer element pulls a receiving structure underneath said drawer; and a plurality of receiving structures in each of said housings, said receiving structures being respectively disposed under said plurality of composting drawers to receive composted material from said plurality of composting drawers.

* * * * *